United States Patent
Welz et al.

(10) Patent No.: US 11,091,200 B2
(45) Date of Patent: Aug. 17, 2021

(54) ZERO TURNING RADIUS MOWER STEERING LEVER MODULES

(71) Applicant: DEERE & COMPANY, Moline, IL (US)

(72) Inventors: Frank M. Welz, Beaver Dam, WI (US); Thomas R. Genz, Mayville, WI (US); Kyle T. Ressler, West Bend, WI (US); Jaimie Pelino, Raleigh, NC (US); Paul O. Elhardt, Charlotte, NC (US)

(73) Assignee: Deere & Company, Moline, IL (US)

( * ) Notice: Subject to any disclaimer, the term of this patent is extended or adjusted under 35 U.S.C. 154(b) by 207 days.

(21) Appl. No.: 16/282,101

(22) Filed: Feb. 21, 2019

(65) Prior Publication Data

US 2020/0269917 A1    Aug. 27, 2020

(51) Int. Cl.
| | | |
|---|---|---|
| B62D 11/18 | (2006.01) | |
| B62D 1/12 | (2006.01) | |
| B62D 3/14 | (2006.01) | |
| A01D 34/68 | (2006.01) | |
| A01D 34/64 | (2006.01) | |
| A01D 101/00 | (2006.01) | |
| B62D 5/06 | (2006.01) | |

(52) U.S. Cl.
CPC .............. *B62D 11/183* (2013.01); *B62D 1/12* (2013.01); *A01D 34/64* (2013.01); *A01D 2034/6843* (2013.01); *A01D 2101/00* (2013.01); *B62D 3/14* (2013.01); *B62D 5/062* (2013.01)

(58) Field of Classification Search
CPC ...... A01D 69/10; A01D 34/66; A01D 34/824; A01D 2101/00; B60T 7/102; B60T 7/108; B60T 11/046; B60T 11/21
USPC .......................................................... 180/6.48
See application file for complete search history.

(56) References Cited

U.S. PATENT DOCUMENTS

| | | | |
|---|---|---|---|
| 5,644,903 A | 7/1997 | Davis, Jr. | |
| 6,578,656 B2 | 6/2003 | Samejima et al. | |
| 7,458,432 B2 * | 12/2008 | Mayer | A01D 34/66 180/6.32 |
| 8,087,481 B2 | 1/2012 | Trefz et al. | |
| 8,240,420 B1 * | 8/2012 | Bartel | A01D 34/64 180/315 |
| 9,313,953 B2 * | 4/2016 | Borshov | B60T 1/005 |
| 9,510,503 B2 * | 12/2016 | Elhardt | A01D 34/001 |
| 10,681,867 B2 * | 6/2020 | Dunbar | A01D 34/66 |

* cited by examiner

*Primary Examiner* — Ruth Ilan
*Assistant Examiner* — Sophia Marie McGuire

(57) ABSTRACT

Each zero turning radius mower steering lever module includes a one-piece plastic housing independently mounted on a grass mowing machine frame member. A central passage extends through each housing, and a steering arm bracket may be positioned in the central passage and pivotably mounted on a horizontal pivot axis. A steering arm may be attached to an upper end of the steering arm bracket, and a hydrostatic transmission linkage and a damper linkage attached to a lower end of the bracket.

14 Claims, 8 Drawing Sheets

ZERO TURNING RADIUS MOWER STEERING LEVER MODULES

FIELD OF THE INVENTION

The present invention relates to grass mowing machines and specifically to zero turning radius mowers.

BACKGROUND OF THE INVENTION

Grass mowing machines known as zero turning radius ("ZTR") mowers have at least one independently powered drive wheel on each side of a frame. One drive wheel may be operated in a forward direction while the other drive wheel may be stopped or operated in reverse. Many ZTR mowers have a twin stick control system. A pair of steering arms or control levers may be provided side-by-side, with each steering arm controlling one of the drive wheels. When both steering arms or control levers are advanced together forwardly out of their neutral position, both drive wheels rotate forwardly to cause the mower to move forward. A ZTR mower may be steered by advancing one steering arm or control lever more than the other.

Typically, each steering arm or control lever on a ZTR mower may be linked to a pump arm of one of two separate hydraulic pumps, or of a dual hydraulic pump; i.e., a separate pump for each wheel. The steering arm or control lever may be used to move a swash plate through a direct linkage.

The steering arms or control levers on a ZTR mower may be mounted to the vehicle frame so that each has a first pivot axis allowing the steering arm or control lever in the operating position to pivot forwardly in an arc to turn the wheel in forward, or pivot rearwardly to turn the wheel in reverse. Additionally, when a steering arm or control lever is in neutral, between forward and reverse, the operator may pivot it outwardly on a second pivot axis. The ZTR mower may stay in neutral when the steering arms or control levers are pivoted outward.

ZTR mowers typically have mounting brackets, fasteners and other attachment devices to attach and hold the steering arms or control levers, park brake system, and various other components to the frame. The number of mounting brackets, fasteners and other attachment devices increases the complexity of grass mowing machines, adds to the parts count and cost, and contributes significant time to the assembly process. These parts also may reduce a machine's reliability and performance. U.S. Pat. No. 9,510,503 for "Grass mowing machine operator platform" addresses these concerns by providing a one-piece plastic composite molded structure with a pair of steering lever slots in the top surface where a pair of steering arms or control levers may be pivotably mounted to steering arm brackets. Each steering lever slot may have a sloped internal surface providing a stop for the steering lever in a parked position, and double walls and steering pivot bolts on integral bearing surfaces through the double walls. The operator platform also may house one or more other components or systems such as the fuel tank, brake system, and engine or electrical controls and gauges. As a result, the operator platform of the '503 patent reduces complexity, reduces the parts count and cost, reduces assembly time, and increases reliability and performance. However, there is a need to further reduce the cost and parts count of a ZTR mower steering system, and to simplify and streamline the ZTR mower assembly process.

SUMMARY OF THE INVENTION

Each zero turning radius mower steering lever module includes a one-piece plastic housing independently mounted on a longitudinal frame member of a zero turning radius mower. A steering arm bracket extends through the housing and is pivotably mounted to the housing. The steering arm bracket pivots on a first horizontal axis to control a hydrostatic transmission in forward and reverse, and pivoting on a second horizontal axis to actuate a park brake. A plurality of stops in the one-piece plastic housing limit how far the steering arm bracket can pivot on the first or the second horizontal axis.

DESCRIPTION OF THE PREFERRED EMBODIMENT

Figure 1:
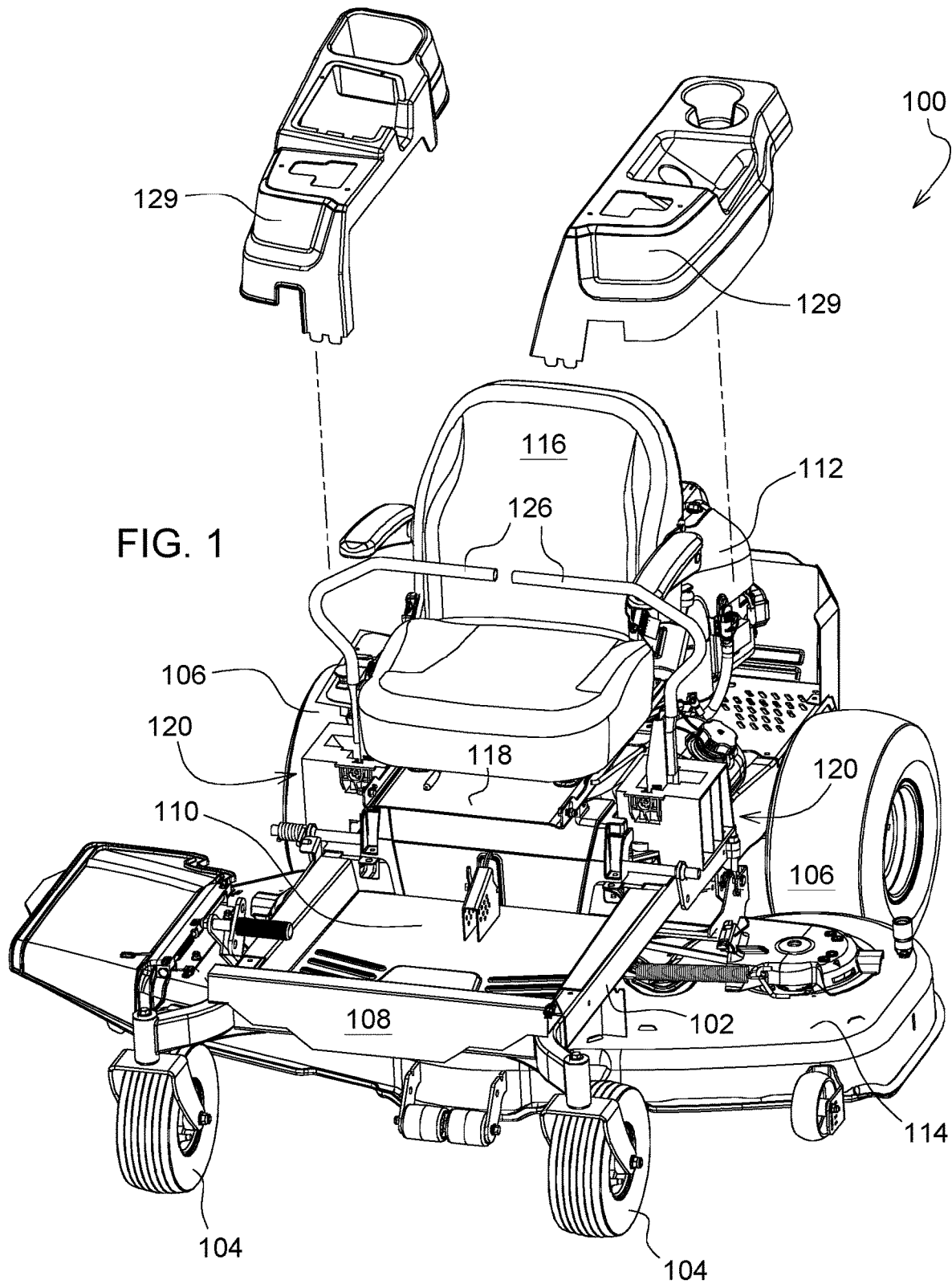
FIG. 1 is a perspective view of a zero turning radius mower with a pair of steering lever modules according to a first embodiment of the invention.

As shown in FIG. 1, in one embodiment, zero turning radius mower 100 may have a pair of longitudinal frame members 102 supported by a pair of front caster wheels 104 at or near the front end of the longitudinal frame members, and a pair of rear traction drive wheels 106 at or near the rear end of the longitudinal frame members. The grass mowing machine frame also may include one or more cross members or plates 108, 110 extending between the longitudinal frame members. Internal combustion engine 112 may be mounted to the frame rearwardly of the rear cross member or onto a rear plate. Alternatively, a battery pack or other power source may be mounted on or to the rear of the frame, instead of an internal combustion engine. Mower deck 114 may be attached or suspended under the longitudinal frame members. Operator seat 116 may be mounted to a platform 118 above the longitudinal frame members.

Figure 2:
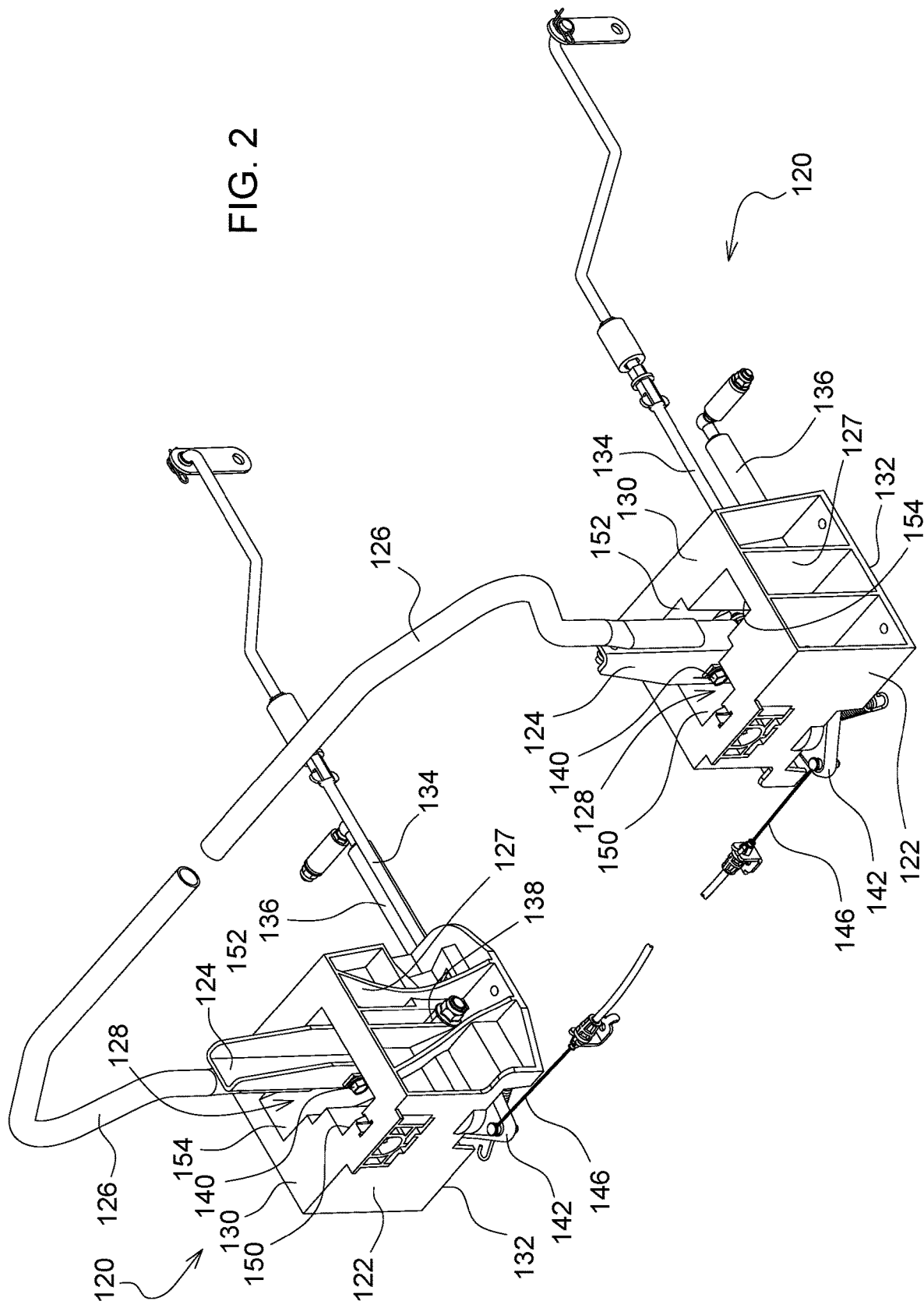
FIG. 2 is a top perspective view of a pair of zero turning radius mower steering lever modules according to a first embodiment of the invention.

As shown in FIG. 2, in one embodiment, zero turning radius mower 100 may have a pair of steering lever modules 120, each module independently mounted to the frame. Each steering lever module 120 may include an identical or very similar one-piece housing 122, with a steering arm bracket 124 pivotably mounted to the housing, and steering arm or control lever 126 attached to the steering arm bracket above the housing. The one-piece housing also may be covered by plastic shroud 129 over the top and side surfaces of the structure.

Figure 3:
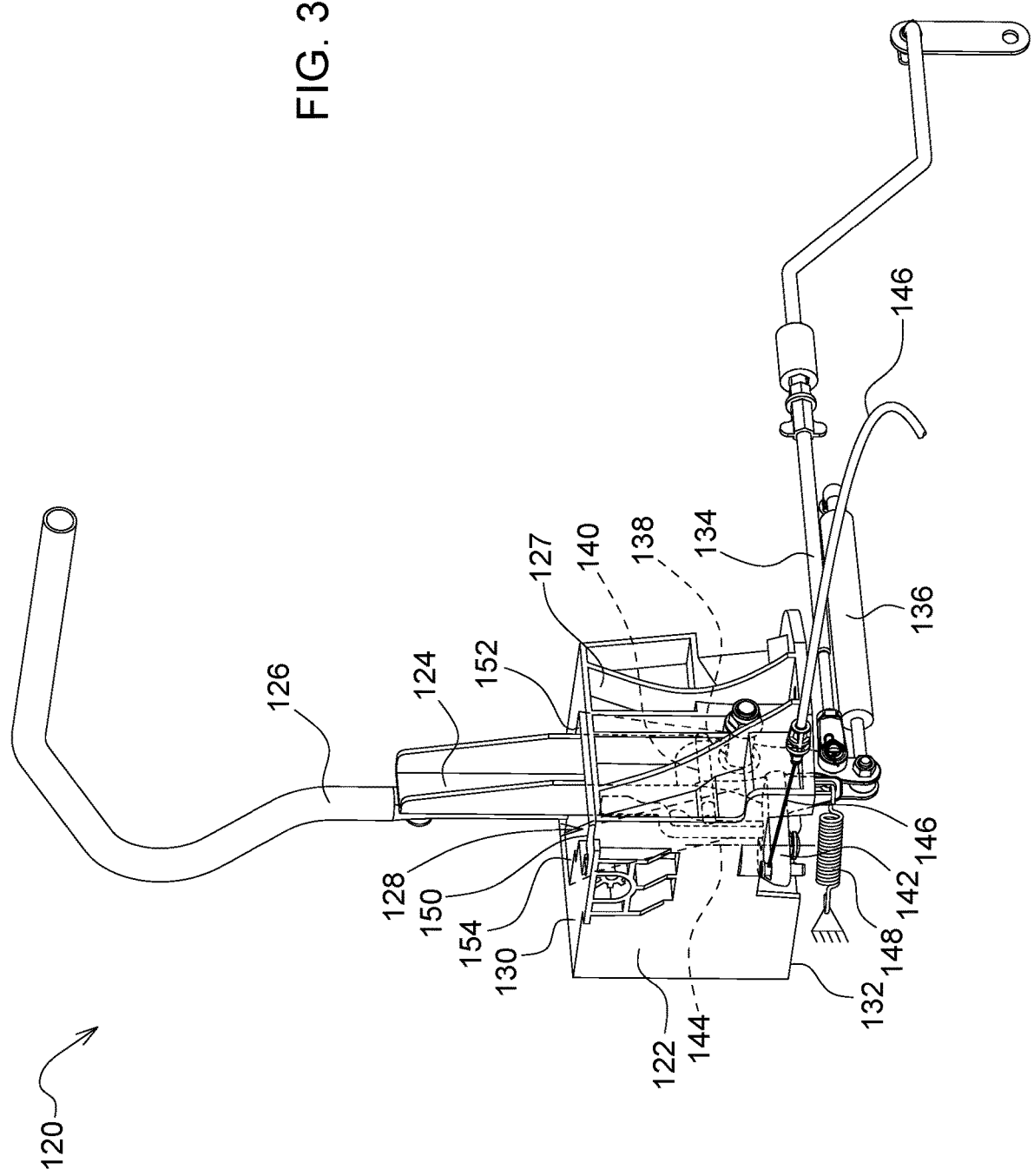
FIG. 3 is a top perspective view, partially in section, of a zero turning radius mower steering lever module according to a first embodiment of the invention.
Figure 4:
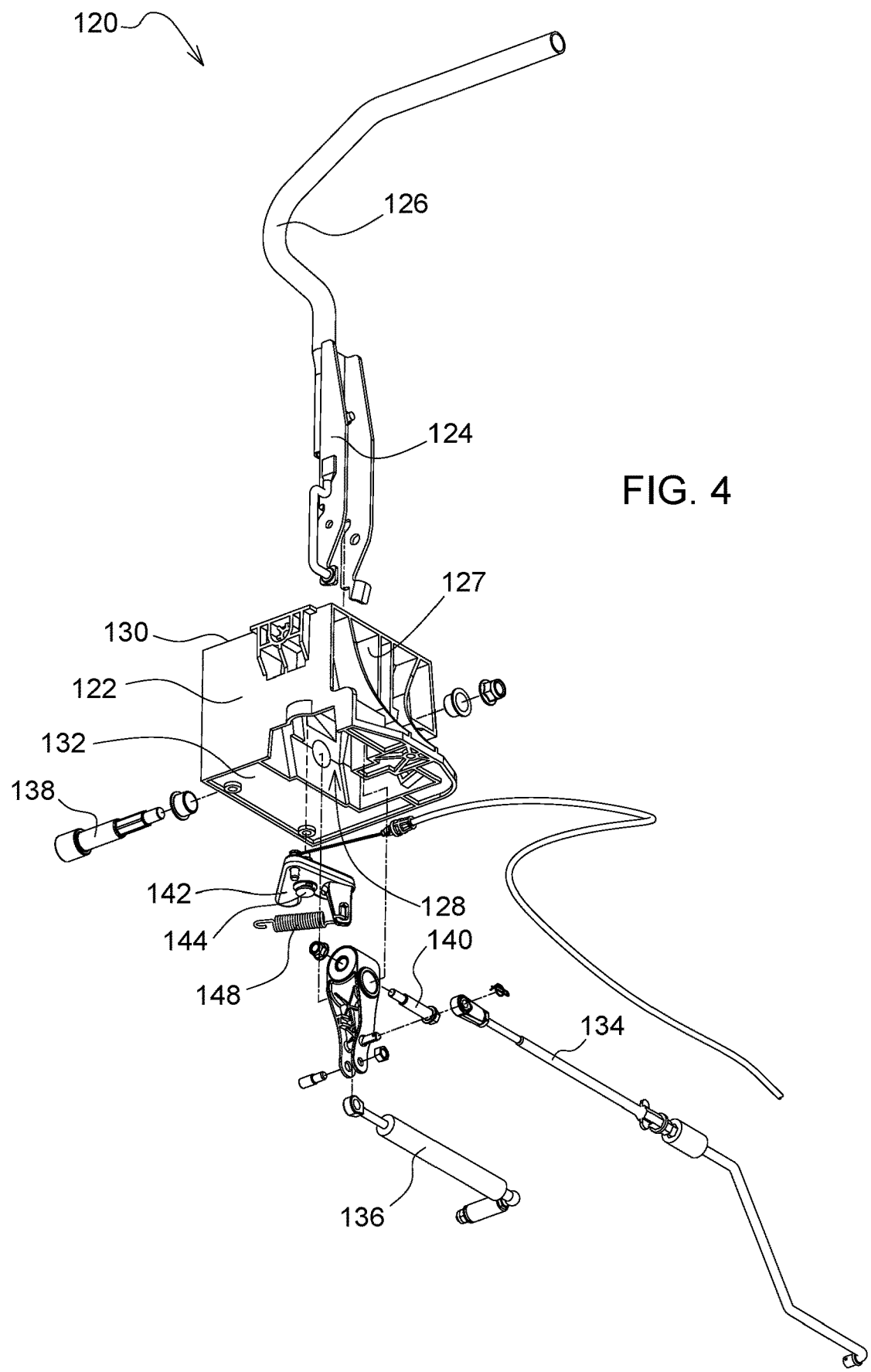
FIG. 4 is an exploded perspective view of a zero turning radius steering lever module according to a first embodiment of the invention.

As shown in FIGS. 3 and 4, each of the pair of steering lever modules 120 may include a one-piece housing 122 that may be a composite molded structure, and may be injection molded. Each housing may be molded from a variety of different plastic materials having high strength and rigidity. For example, the material may be in the range of about 15% to about 50% glass filled polypropylene, polyamide or polyethylene. For example, each housing may be an injection molded structure having walls with a wall thickness between about 3 mm and about 7 mm. Each housing may include multiple ribbed support elements 127, and a central passage 128 extending generally vertically through the housing between the top surface 130 and bottom surface 132 of the housing. The bottom surface of the housing may be mounted directly on a longitudinal frame member.

As shown in FIGS. 3 and 4, in one embodiment, each of the pair steering lever modules 120 may include a steering arm bracket 124 pivotably mounted in central passage 128. The steering arm bracket may be a formed sheet metal part or casting. Steering arm or control lever 126 may be attached to the upper end of the steering arm bracket adjacent or above the top of the central passage 128 and top surface 130 of the housing. Hydrostatic transmission linkage 134 and damper linkage 136 may be attached to the lower end of the steering arm bracket below or adjacent the central passage and bottom surface 132 of the housing. The hydrostatic transmission linkage may connect the steering arm bracket to one of two separate hydraulic pumps, or a dual hydraulic pump, to move a swash plate. The damper linkage may be connected to a damper cylinder. Steering arm bracket 124 may be pivotably mounted on first steering pivot 138 so that the steering arm or control lever may be pivoted forward to a maximum angle of about 20 degrees from neutral, and rearward to a maximum angle of about 10 degrees from neutral. The first steering pivot may extend horizontally across the central passage. Additionally, the steering arm bracket also may include a second pivot axis 140 for the steering arm bracket and steering arm or control lever to move between the inward and outward positions. The laterally outward or park position may have a maximum angle of about 36 degrees, to improve operator access to or from the operator's seat.

In one embodiment, the central passage of each steering lever module 120 may include stops for the steering arm bracket, at the maximum angles to pivot forward or reverse as the steering lever is used to turn the traction wheels and steer, and to the left and right as the steering levers are pivoted outward to park the ZTR mower and enter or exit the operator seat. For example, forward and reverse stops 150, 152 may include sloped internal surfaces of the central passage that are at the maximum angle of forward and reverse, and park stop 154 may include a sloped surface at the maximum angle for pivoting the steering lever laterally outward to the park position.

As shown in FIGS. 3 and 4, in one embodiment, each of the pair of steering lever modules 120 may include a park brake actuating member 142 that pivots between a park brake engaged position when the steering lever is pivoted outwardly against the stop, and a park brake disengaged position when the steering lever is pivoted away from the stop. For example, the park brake actuating member may be an over center pivot member. Park brake cable 146 may connect the park brake actuating member to a park brake. For example, the over center pivot member may be pivotably mounted on pivot pin 144 to the housing 122. Spring 148 may bias and hold the park brake engagement member in either of the engaged or disengaged positions. The operator may engage the park brake by moving the steering arm or control lever to the outward or park position. The steering arm bracket pushes the over center pivot member toward the engaged position, and spring 148 then biases and holds it in the engaged position. Similarly, the operator may disengage the park brake by moving the steering arm or control lever to the inward position. The steering arm bracket pushes the over center pivot member toward the disengaged position, and spring 148 then biases and holds it in the disengaged position.

Figure 5:
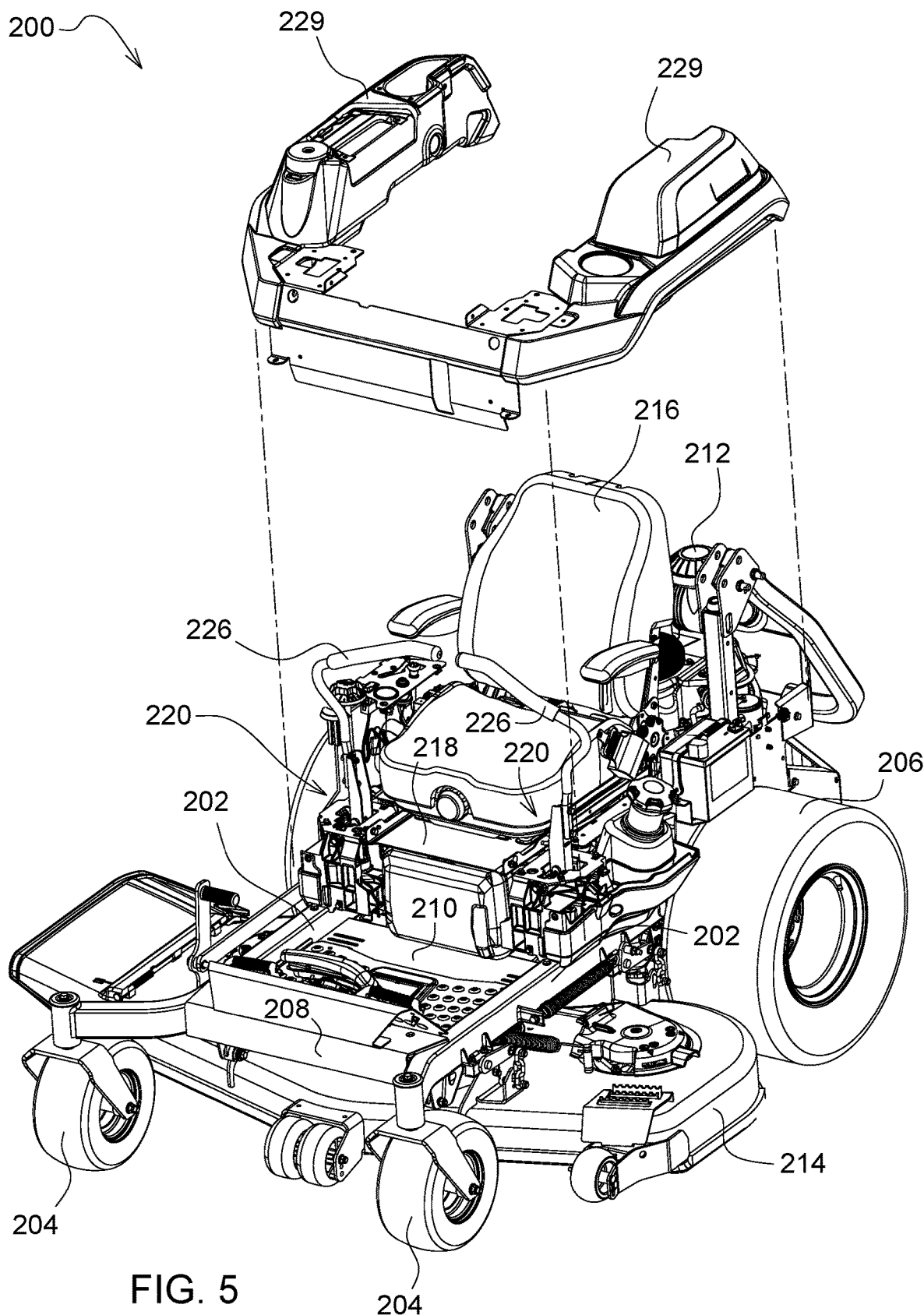
FIG. 5 is a perspective view of a zero turning radius mower with a pair of steering lever modules according to a second embodiment of the invention.

As shown in FIG. 5, in a second embodiment, zero turning radius mower 200 may have a pair of longitudinal frame members 202 supported by a pair of front caster wheels 204 at or near the front end of the longitudinal frame members, and a pair of rear traction drive wheels 206 at or near the rear end of the longitudinal frame members. The grass mowing machine frame also may include one or more cross members or plates 208, 210 extending between the longitudinal frame members. Internal combustion engine 212 may be mounted to the frame rearwardly of the rear cross member or onto a rear plate. Alternatively, a battery pack or other power source may be mounted on or to the rear of the frame, instead of an internal combustion engine. Mower deck 214 may be attached or suspended under the longitudinal frame members. Operator seat 216 may be mounted to a platform 218 above the longitudinal frame members.

Figure 6:
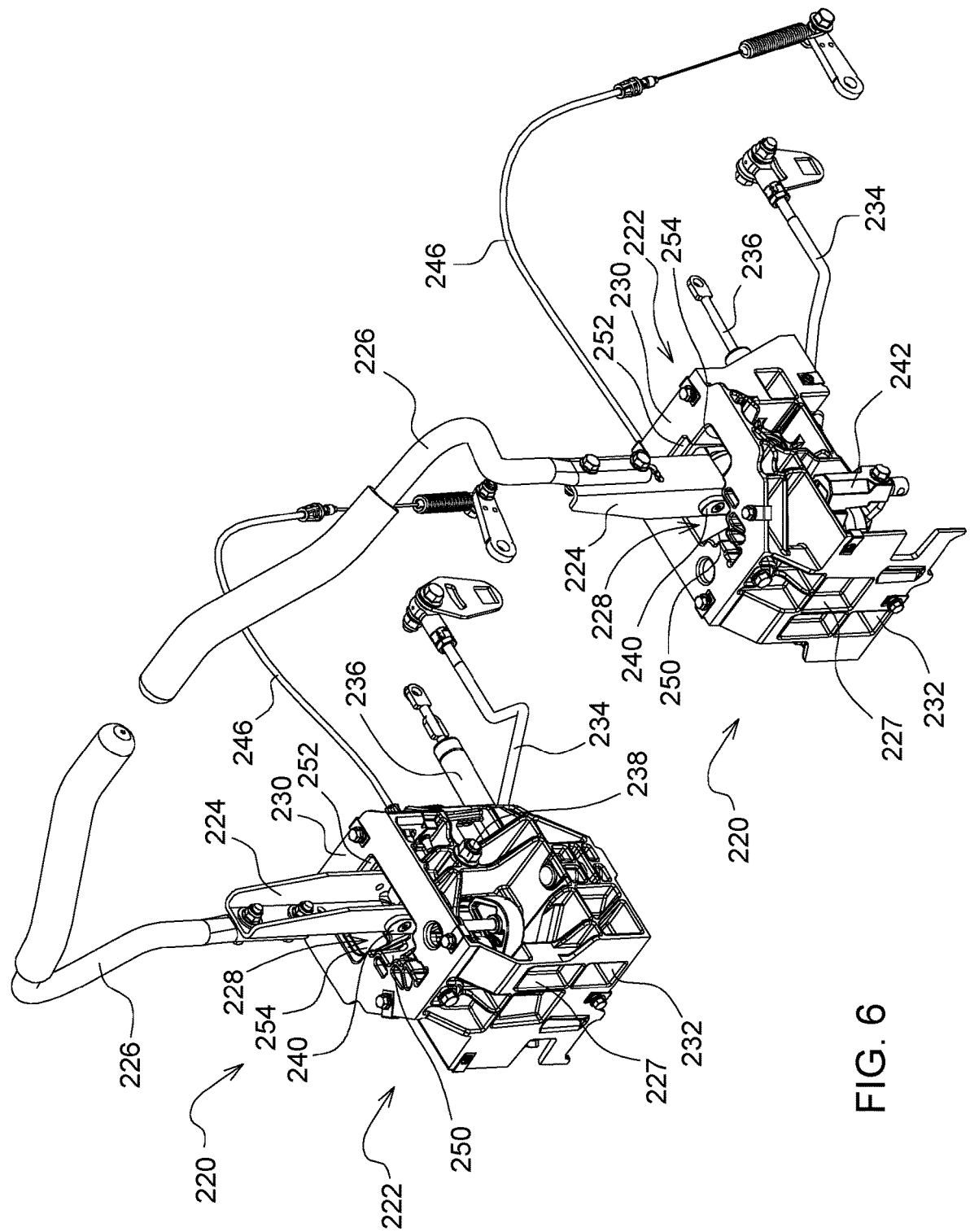
FIG. 6 is a top perspective view of a pair of zero turning radius mower steering lever modules according to a second embodiment of the invention.

As shown in FIG. 6, in a second embodiment, zero turning radius mower 200 may have a pair of steering lever modules 220 mounted to the frame. Each steering lever module 220 may include a one piece housing 222, a steering arm bracket 224 pivotably mounted to the housing, and a steering arm or control lever 226 attached to the steering arm bracket above the housing. The one piece plastic housing also may be covered by plastic shroud 229 over the top and side surfaces of the structure.

Figure 7:
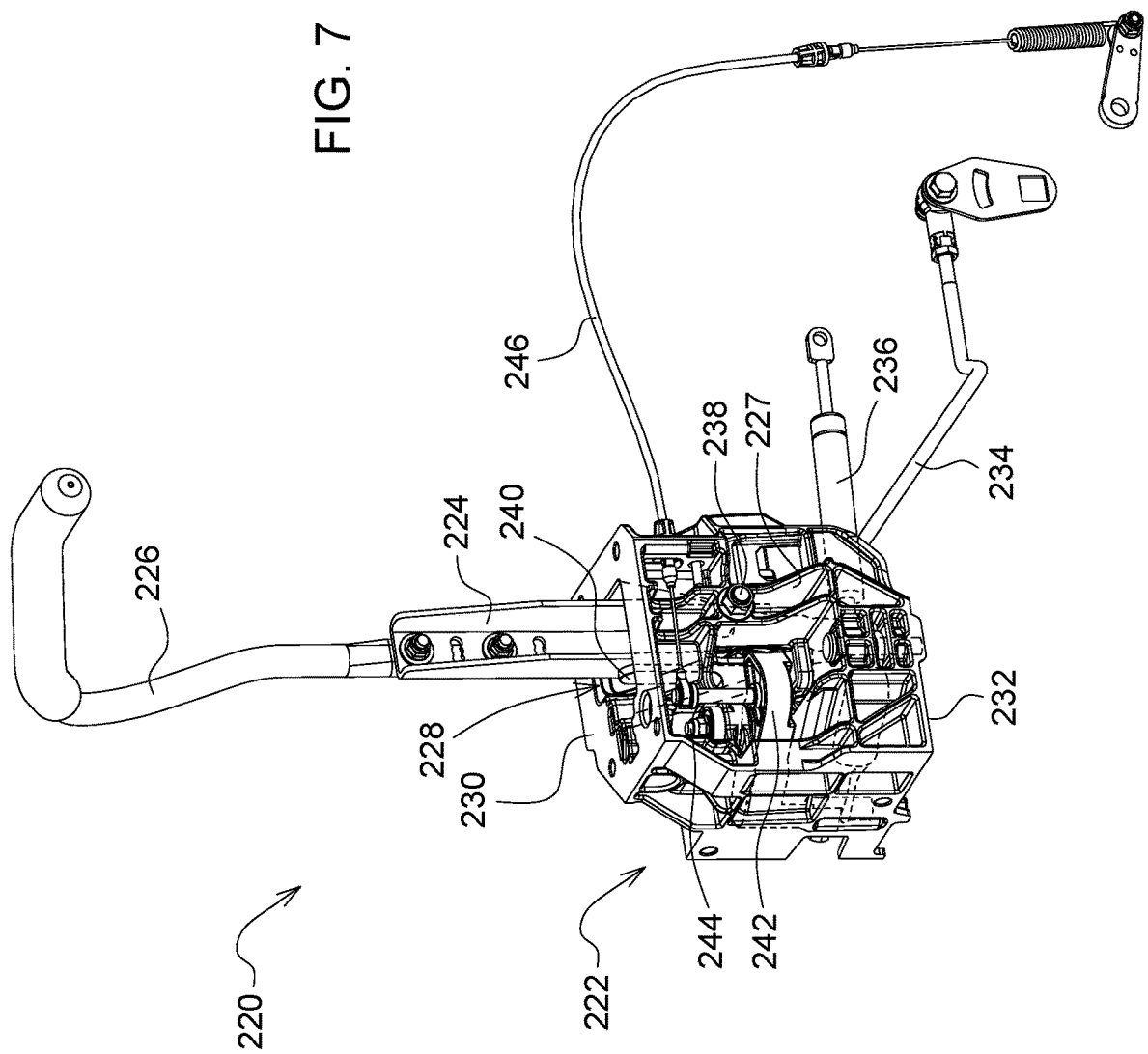
FIG. 7 is a top perspective view, partially in section, of a zero turning radius mower steering lever module according to a second embodiment of the invention.
Figure 8:
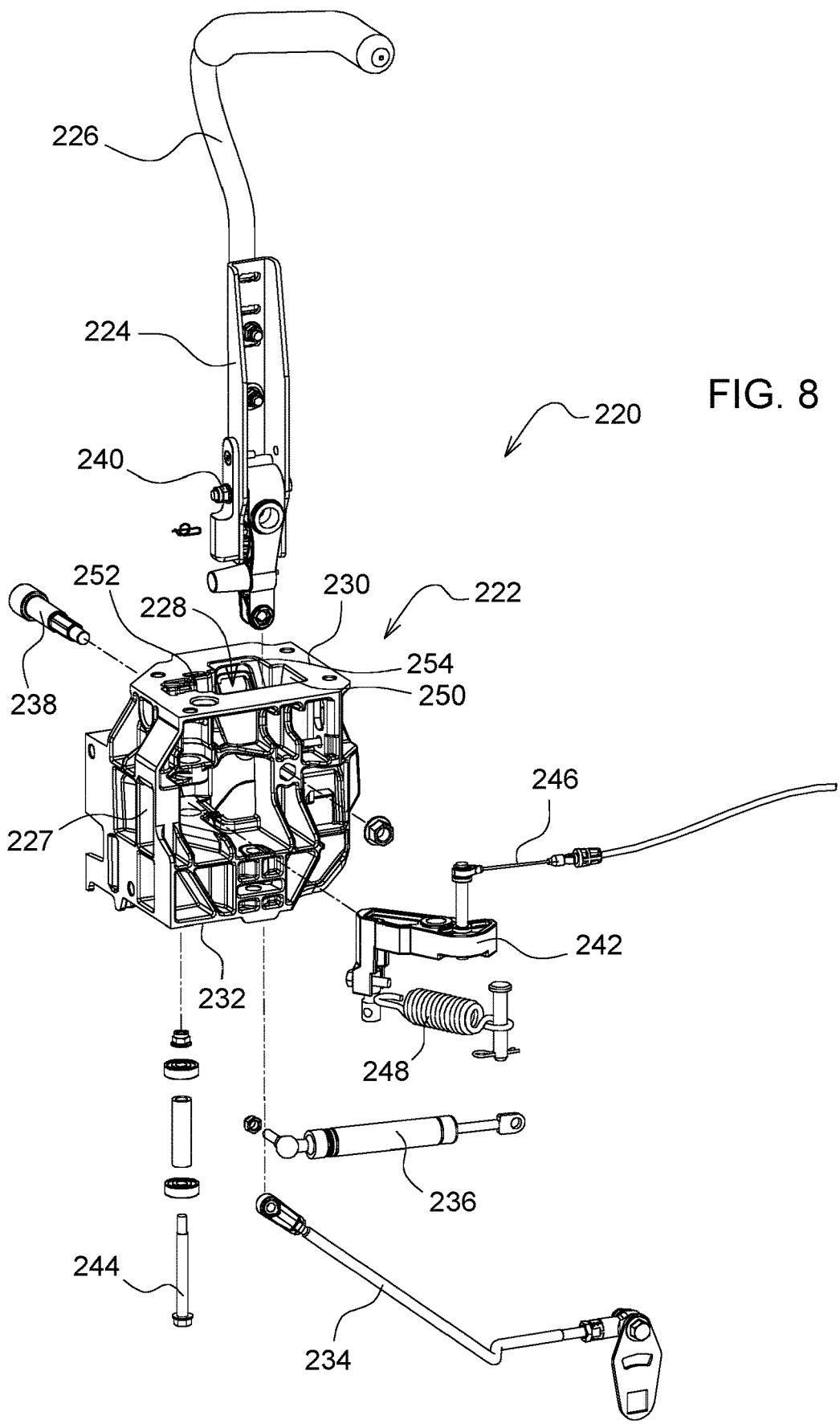
FIG. 8 is an exploded perspective view of a zero turning radius steering lever module according to a second embodiment of the invention.

As shown in FIGS. 7 and 8, each of the pair of steering lever modules 220 may include a one piece housing 222 that may be a composite molded structure, and may be injection molded. Each housing may be molded from a variety of different plastic materials having high strength and rigidity. For example, the material may be in the range of about 15% to about 50% glass filled polypropylene, polyamide or polyethylene. For example, each housing may be an injection molded structure having walls with a wall thickness between about 3 mm and about 7 mm. Each housing may include multiple ribbed support elements 227, and a central passage 228 extending generally vertically through the housing between the top surface 230 and bottom surface 232 of the housing. The bottom surface of the housing may be mounted to one of the longitudinal frame members.

As shown in FIGS. 7 and 8, in one embodiment, each of the pair steering lever modules 220 may include a steering arm bracket 224 pivotably mounted in central passage 228. The steering arm bracket may a formed sheet metal or casting. Steering arm or control lever 226 may be attached to the upper end of the steering arm bracket above or adjacent the top of the central passage 228 and top surface 230 of the housing. Hydrostatic transmission linkage 234 and damper linkage 236 may be attached to the lower end of the steering arm bracket below or adjacent the central passage and bottom surface 232 of the housing. The hydrostatic transmission linkage may connect the steering arm bracket to one of two separate hydraulic pumps, or a dual hydraulic pump, to move a swash plate. The damper linkage may be connected to a damper cylinder. Steering arm bracket 224 may be pivotably mounted on steering pivot bolt 238 which may extend horizontally across the central passage and provide a first pivot axis allowing the steering arm bracket and steering arm or control lever to move between the forward and reverse positions. Additionally, the steering arm bracket also may include a second pivot axis 240 for the steering arm bracket and steering arm or control lever to move between the inward and outward positions.

In one embodiment, the central passage of each steering lever module 220 may include stops for the steering arm bracket, to pivot in forward or reverse as the steering lever is used to turn the traction wheels and steer, and to the left and right as the steering levers are pivoted to park the ZTR mower and enter or exit the operator seat. For example, forward and reverse stops 250, 252 may include sloped internal surfaces that are at the maximum angle of the forward and reverse, and park stop 254 may include a sloped surface at the maximum outward angle for pivoting the steering lever laterally outward.

As shown in FIGS. 7 and 8, in a second embodiment, each of the pair of steering lever modules 220 may include a park brake actuating member such as over center pivot member 242 that pivots between a park brake engaged position and park brake disengaged position. Park brake cable 246 may connect the park brake actuating member to a park brake. The park brake actuating member may be pivotably mounted on pivot pin 244 to the housing 222. Spring 248 may bias and hold the park brake engagement member in either of the engaged or disengaged positions. The operator may engage the park brake by moving the steering arm or control lever to the outward position. The steering arm bracket pushes the over center pivot member toward the engaged position, and spring 248 then biases and holds it in the engaged position. Similarly, the operator may disengage the park brake by moving the steering arm or control lever to the inward position. The steering arm bracket pushes the over center pivot member toward the disengaged position, and spring 248 then biases and holds it in the disengaged position.

Each of the pair of zero turning radius mower steering lever modules may be assembled at times and locations remote from their installation on zero turning radius mowers, to simplify and reduce manufacturing costs. Additionally, each zero turning radius mower steering lever module may replace a number of individual components.

Having described the preferred embodiments, it will become apparent that various modifications can be made without departing from the scope of the invention as defined in the accompanying claims.

We claim:

1. A zero turning radius mower, comprising:
 a first steering lever module and a second steering lever module; each steering lever module including:
 a one-piece plastic housing;
 a central passage extending through the housing between a top surface and a bottom surface of the housing;
 a steering arm bracket positioned in the central passage and pivotably mounted on a pivot axis in the housing;
 a steering arm attached to an upper end of the steering arm bracket;
 a hydrostatic transmission linkage and a damper linkage attached to a lower end of the bracket.

2. The zero turning radius mower of claim 1 wherein each central passage includes a first sloped surface providing a stop to limit pivoting of the steering arm bracket on a first horizontal axis, and a second sloped surface providing a stop to limit pivoting of the steering arm bracket on a second horizontal axis.

3. The zero turning radius mower of claim 1 wherein each steering arm is attached to the steering arm bracket near the top surface of the housing.

4. The zero turning radius mower of claim 1 wherein each hydrostatic transmission linkage and each damper linkage are connected to the steering arm bracket near the bottom surface of the housing.

5. The zero turning radius mower of claim 1 further comprising a brake actuating member pivotably mounted to each housing and actuating a brake cable to apply a park brake when the steering arms pivot outwardly against a stop.

6. A zero turning radius mower, comprising:
 a pair of steering arm brackets pivotably mounted in and extending through a pair of central passages in a pair of one-piece plastic housings; and
 a park brake actuating member that is actuated by pivoting each of the steering arm brackets against a sloped stop surface in each of the central passages.

7. The zero turning radius mower of claim 6, further comprising a hydrostatic transmission linkage and a damper linkage connected to each of the steering arm brackets.

8. The zero turning radius mower of claim 6 wherein each of the steering arm brackets includes a first pivot axis and a second pivot axis.

9. A zero turning radius mower, comprising:
 a pair of steering lever modules, each module including:
 a one-piece plastic housing mounted on a longitudinal frame member of the zero turning radius mower;
 a steering arm bracket extending through the housing and pivotably mounted to the housing;
 the steering arm bracket pivoting on a first horizontal axis to control a hydrostatic transmission in forward and reverse, and pivoting on a second horizontal axis to actuate a park brake; and
 a plurality of stops in the one-piece plastic housing limiting how far the steering arm bracket can pivot on the first or the second horizontal axis.

10. The zero turning radius mower of claim 9 further comprising an over center pivot member in each housing, each steering bracket moving the over center pivot member to actuate the park brake.

11. The zero turning radius mower of claim 9 further comprising a linkage connecting each steering arm bracket to a hydrostatic transmission.

12. The zero turning radius mower of claim 9 further comprising a park brake actuator pivotably mounted in each housing.

13. The zero turning radius mower of claim 12 further comprising a cable connecting each park brake actuator to a park brake.

14. The zero turning radius mower of claim 9 wherein one of the pair of steering lever modules is independently mounted on a longitudinal frame member on the left side of the zero turning radius mower, and the other of the pair of steering lever modules independently mounted on a longitudinal frame member on the right side of the zero turning radius mower.

\* \* \* \* \*